United States Patent [19]

Lavinsky et al.

[11] Patent Number: 5,208,795
[45] Date of Patent: * May 4, 1993

[54] CLEANER UNIT WITH JET SPRAY FOR INFORMATION DISKS

[76] Inventors: Joshua F. Lavinsky, 350 San Fernando Blvd., #301, Burbank, Calif. 91502; Dean S. Graham, 17551 Lemay Pl., Van Nuys, Calif. 91406; Gary D. Gibson, 3021 Trudi La., Burbank, Calif. 91504

[*] Notice: The portion of the term of this patent subsequent to Jun. 30, 2009 has been disclaimed.

[21] Appl. No.: 851,243

[22] Filed: Mar. 13, 1992

Related U.S. Application Data

[62] Division of Ser. No. 670,688, Mar. 18, 1991, Pat. No. 5,126,992.

[51] Int. Cl.$^5$ .............................................. G11B 3/58
[52] U.S. Cl. .................................. 369/72; 360/128; 360/137; 15/302; 15/DIG. 14
[58] Field of Search ................... 369/71-74, 369/75.1; 360/137, 128; 15/302, 28, DIG. 13, DIG. 14; 134/148, 147, 153, 154, 151

[56] References Cited

U.S. PATENT DOCUMENTS

| | | | |
|---|---|---|---|
| 3,747,942 | 7/1973 | Hammond | 369/72 |
| 4,639,813 | 1/1987 | Uno | 360/128 |
| 5,126,992 | 6/1992 | Lavinsky et al. | 369/75.1 |

FOREIGN PATENT DOCUMENTS

| | | | |
|---|---|---|---|
| 0100701 | 8/1979 | Japan | 369/72 |
| 0273282 | 11/1989 | Japan | 369/72 |

Primary Examiner—A. J. Heinz
Assistant Examiner—Joseph A. Rhoa
Attorney, Agent, or Firm—Kelly Bauersfeld & Lowry

[57] ABSTRACT

A cleaner unit is provided for applying a liquid cleaning solution onto the surface of an information disk, such as a so-called compact laser disk or the like. The cleaner unit includes a housing with a rotatable spindle (22) adapted to support the information disk in a generally horizontal orientation, in combination with a circulation system having a rotatable pump impeller (24) for spraying a jet of a cleaning solution onto the underside of the disk (12) near the spindle. A drive motor is operated by a control circuit for initially rotating the spindle and impeller in a first direction for spraying the cleaning solution against the spinning disk, with the rotational disk movement causing the cleaning solution to spread radially outwardly as a film over the underside disk surface. The cleaning solution is thrown from the disk periphery and is captured by an outer contoured deflector shroud (99) for recirculation to the pump impeller. At the conclusion of a short cleaning cycle, the control circuit reverses the direction of spindle and impeller rotation to spin the disk in an opposite or second direction for the duration of a short dry cycle, without applying cleaning solution to the disk.

4 Claims, 5 Drawing Sheets

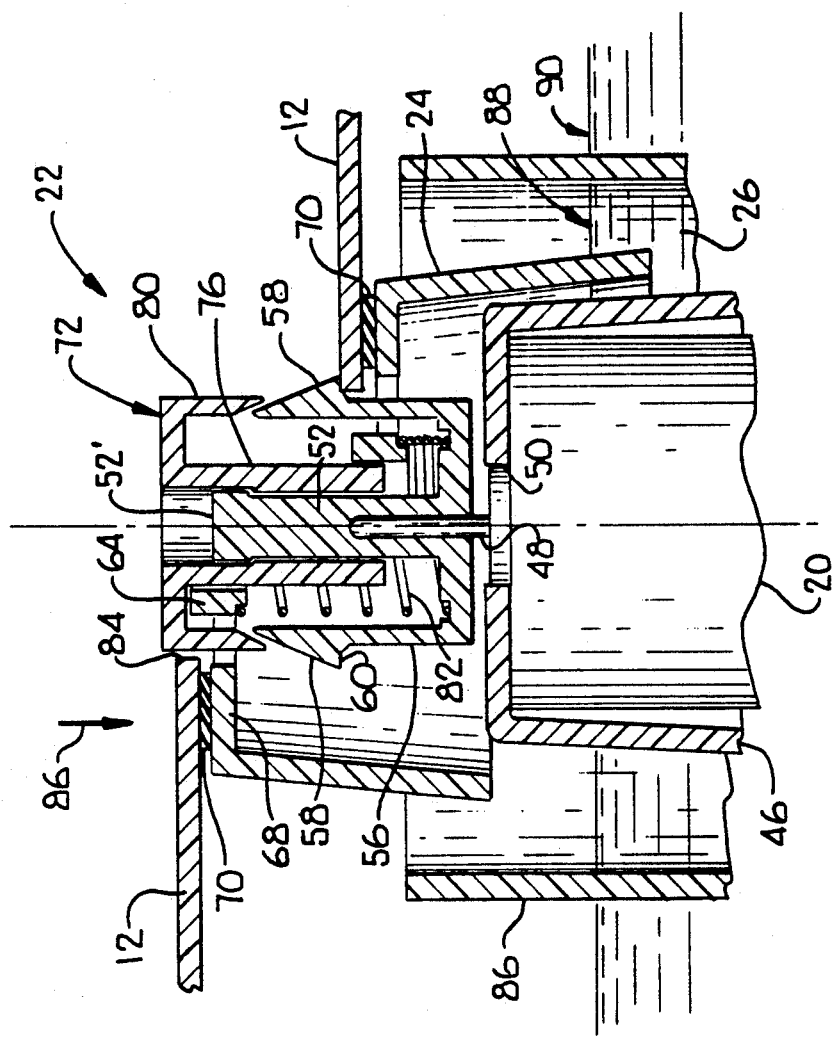
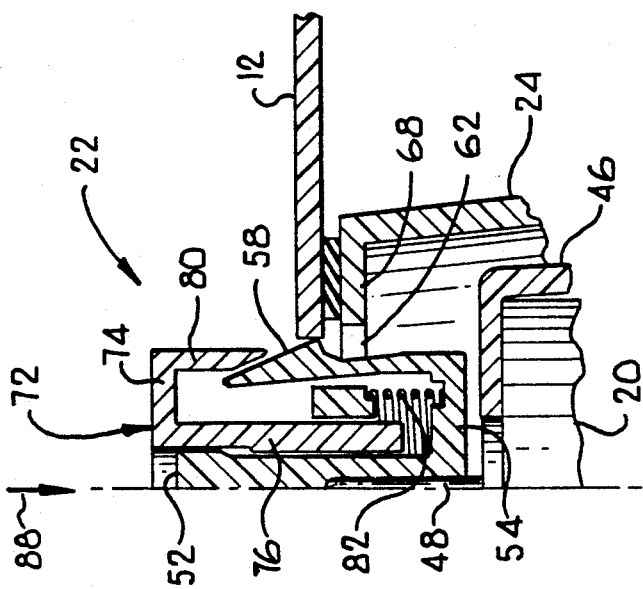
FIG. 4
FIG. 5

CLEANER UNIT WITH JET SPRAY FOR INFORMATION DISKS

This is a division of application Ser. No. 07/670,688, filed Mar. 18, 1991, now U.S. Pat. No. 5,126,992.

BACKGROUND OF THE INVENTION

This invention relates generally to devices and methods for cleaning information disks, particularly such as so-called compact laser disks of the type used to store information in audio, video, and/or computer memory applications and the like. More specifically, this invention relates to an improved cleaner unit for removing particulate and oil-based substances from the surface of an information disk in a non-contact manner.

Laser type information disks are relatively well-known for use in storing selected information which can be optically retrieved through the use of a relatively low power laser. Such disks typically comprise a thin metallic film or the like sandwiched between overlying disk-shaped layers of a substantially transparent plastic material. Selected information for use in audio and/or video or computer memory applications is transferred to the metallic film through the use of a modulated laser beam which etches or pits the film. The surface of the film is thus disrupted and constitutes a physical representation of the stored information, wherein this information is typically arranged in a closely spaced array of concentric tracks. A readout laser responds to the resultant reflective and nonreflective geometry of the film to provide electronic signals capable of demodulation to retrieve the stored information. The use of compact disks of this general type has recently gained widespread popularity for use in modern audio and/or video systems, as well as for use in storing information in modern computer systems.

Compact laser disks of the above-described type beneficially provide a space efficient and relatively durable information record. However, dirt and other foreign materials such as dust and oil-based spots attributable to fingerprints and the like can interfere with accurate information retrieval. It is therefore necessary, in some instances, to clean the plastic outer surface of the compact disk for purposes of improving readout resolution.

In the past, a variety of disk cleaner devices and related cleaner methods have been proposed for use in removing dirt and other foreign matter from the surface of an information storage disk. Such cleaning devices have generally involved contact cleaning methods using soft pads or brushes or other physical structures which directly contact the disk surface, typically in conjunction with a selected cleaning solvent. Examples of such contact type cleaning devices are typified in U.S. Pat. Nos. 4,202,071; 4,520,470; 4,654,917; and 4,662,025. Unfortunately, the use of cleaner pads and other direct contact implements can scratch or mar the disk surface, resulting in permanent disk damage which can interfere with information readout.

Noncontact cleaner devices have been proposed for use in removing dirt from the surface of a conventional grooved phonograph record. See, for example, U.S. Pat. 3,747,942. In this device, a cleaning solution is sprayed over the surface of a rotated record for purposes of washing unwanted debris therefrom. However, this device requires significant manual manipulation of components to properly install a phonograph record to be cleaned and to apply cleaning solution to the surface thereof. Moreover, the device does not provide adequate cleaning solution control to prevent cleaning solution from splashing onto or otherwise contacting other equipment components. Still further, subsequent to a cleaning step, it is usually necessary to dry the cleaned record, wherein such drying step is normally accomplished with a soft cloth or the like in direct physical contact with the information surface of the record.

There exists, therefore, a significant need for an improved cleaner unit adapted for noncontact cleaning of an information disk, particularly wherein the cleaner unit is designed for closely regulating flow of a selected cleaning solution, and further wherein the cleaner unit includes means for drying a cleaned disk in a noncontact manner. The present invention fulfills these needs and provides further related advantages.

SUMMARY OF THE INVENTION

In accordance with the invention, an improved cleaner unit is provided for use in noncontact cleaning of an information disk, such as a so-called compact laser disk or the like. The cleaner unit comprises a housing having a rotatable spindle for receiving and rotatably supporting an information disk to be cleaned in a generally horizontal orientation. When the disk is rotatably driven by the spindle in a first direction, a fluid circulation system applies a small jet of a selected cleaning solution onto an underside surface of the rotating disk at a position near the center thereof, such that the cleaning solution is spread radially outwardly as a film across the disk surface. The cleaning solution is thrown further from the disk in a radially outward direction for collection by an annular contoured deflector shroud which recirculates the cleaning solution to a pump impeller. At the conclusion of a cleaning cycle, the spindle rotatably drives the disk in an opposite direction for a short dry cycle, without applying cleaning solution to the disk.

In accordance with the preferred form of the invention, the spindle is mounted within an upwardly open housing base and adapted to be rotatably driven by a suitable drive motor. The spindle includes a means hub adapted to fit through a central aperture in an information disk to be cleaned, and for releasably clamping the disk for rotation with the spindle.

The motor driven spindle additionally carries a pump impeller in the form of a vaneless cone segment having a lower edge disposed within a well having cleaning solution therein. A spiral ramp extends upwardly from the well to a position closely underlying an information disk mounted on the spindle. Rotational driving of the spindle and pump impeller in a first direction causes the cleaning solution to travel up the spiral ramp and to be thrown as a small jet against the underside of the spinning information disk near the center of the disk. The spinning disk causes the cleaning solution to shear outwardly as a film, thereby covering the disk surface to remove dirt and debris therefrom. The cleaning solution is thrown from the disk periphery in a radially outward direction into the outer deflector shroud for gravitational recirculation to the well. A filter may be provided for removing particulate from the cleaning solution during such return flow to the pump well.

A control circuit is provided for automatically operating the drive motor in a manner providing a short cleaning cycle followed immediately by a short dry cycle. More particularly, when the cleaner unit is activated as by depression of a start button, the control circuit operates the drive motor to rotate the spindle and pump impeller in the first direction to apply cleaning solution to the underside disk surface, as described above. At the conclusion of a short cleaning cycle, the control circuit automatically reverses the direction of drive motor rotation, thereby also reversing the direction of spindle and pump impeller rotation. Importantly, such reversal in the direction of pump impeller rotation interrupts cleaning solution flow along the spiral ramp, and thereby halts supply of cleaning solution to the spinning disk. As a result, the information disk is rotated for the duration of a short dry cycle to remove residual cleaning solution therefrom.

Other features and advantages of the present invention will become more apparent from the following detailed description, taken in conjunction with the accompany drawings which illustrate, by way of example, the principles of the invention.

BRIEF DESCRIPTION OF THE DRAWINGS

The accompanying drawings illustrate the invention. In such drawings:

FIG. 4 is a further enlarged and fragmented vertical sectional view corresponding with a portion of FIG. 3, and illustrating mounting of an information disk onto a drive spindle of the cleaner unit;

FIG. 5 is an enlarged fragmented vertical sectional view similar to FIG. 4, and depicting release of an information disk from the drive spindle of the cleaner unit;

DETAILED DESCRIPTION OF THE PREFERRED EMBODIMENT

Figure 1:
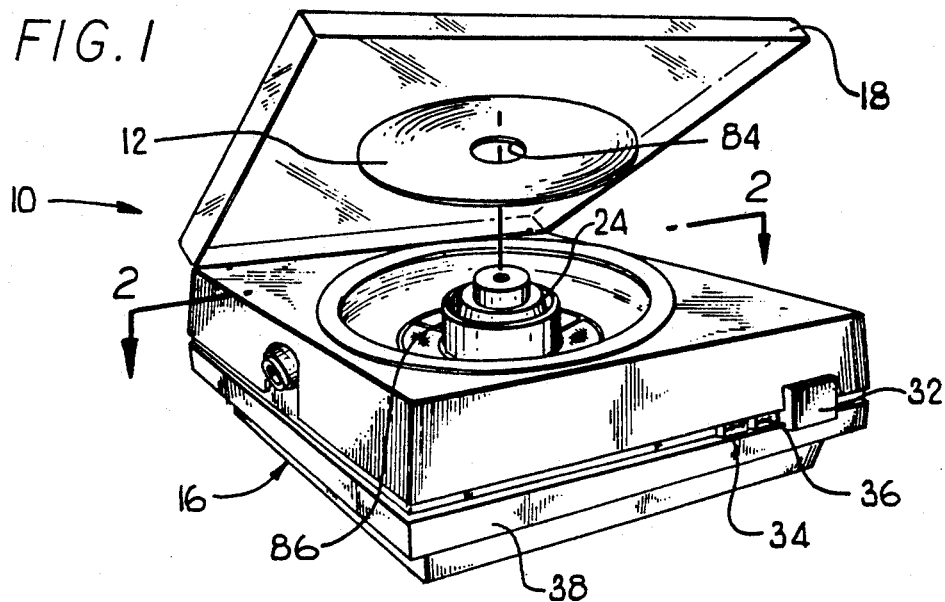
FIG. 1 is a front perspective view illustrating a disk cleaner unit embodying the novel features of the invention, and showing the cleaner unit in an open configuration for receiving an information disk to be cleaned.

As shown in the exemplary drawings, a relatively compact and improved cleaner unit referred to generally in FIG. 1 by the reference numeral 10 is provided for quickly and easily cleaning an information storage disk 12 in a noncontact manner. The cleaner unit 10 is designed particularly for use with so-called compact laser disks in audio and/or video or computer memory applications and the like. The cleaner unit 10 applies a liquid cleaning solution to the disk to remove dirt and debris therefrom and then automatically dries the cleaned disk surface, all in a manner avoiding cleaning pads and other direct contact implements which can otherwise scratch or mar the disk surface.

Figure 2:
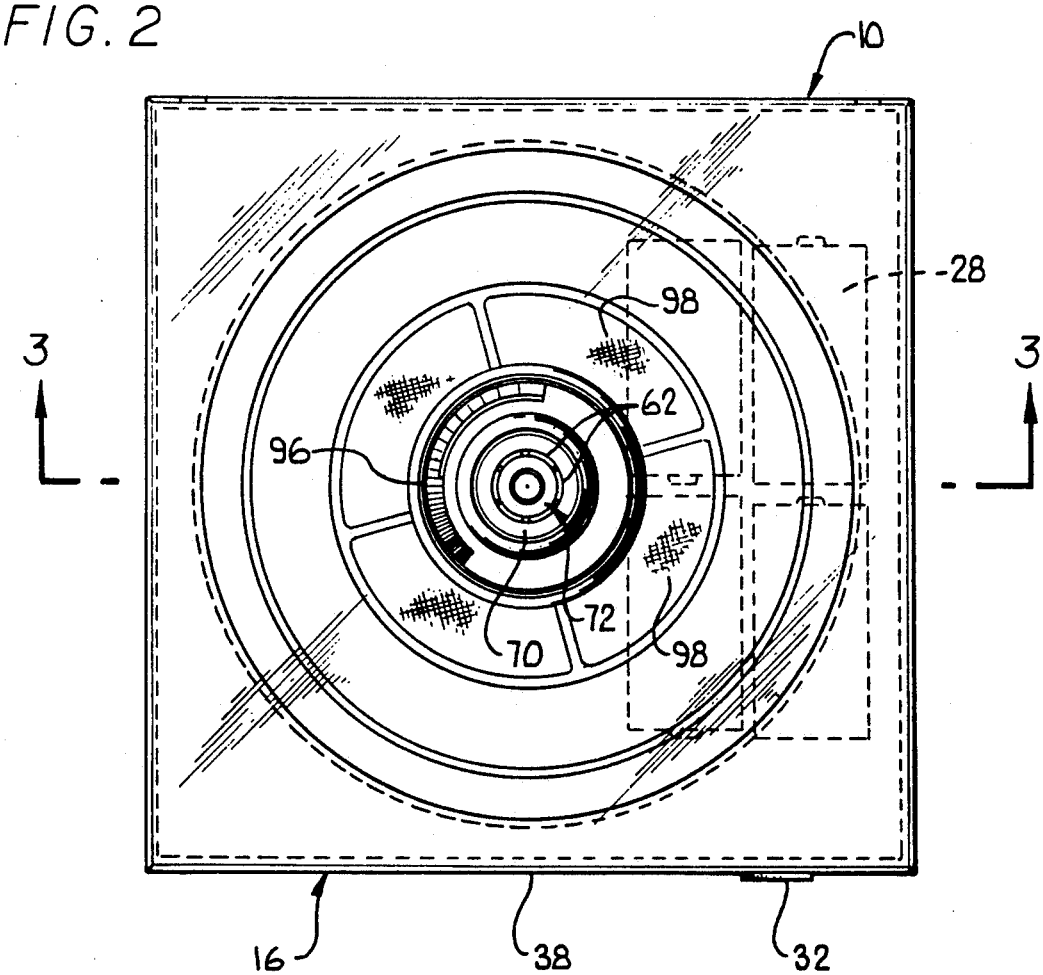
FIG. 2 is an enlarged top plan view illustrating a housing base for the cleaner unit, taken generally on the line 2—2 of FIG. 1.
Figure 3:
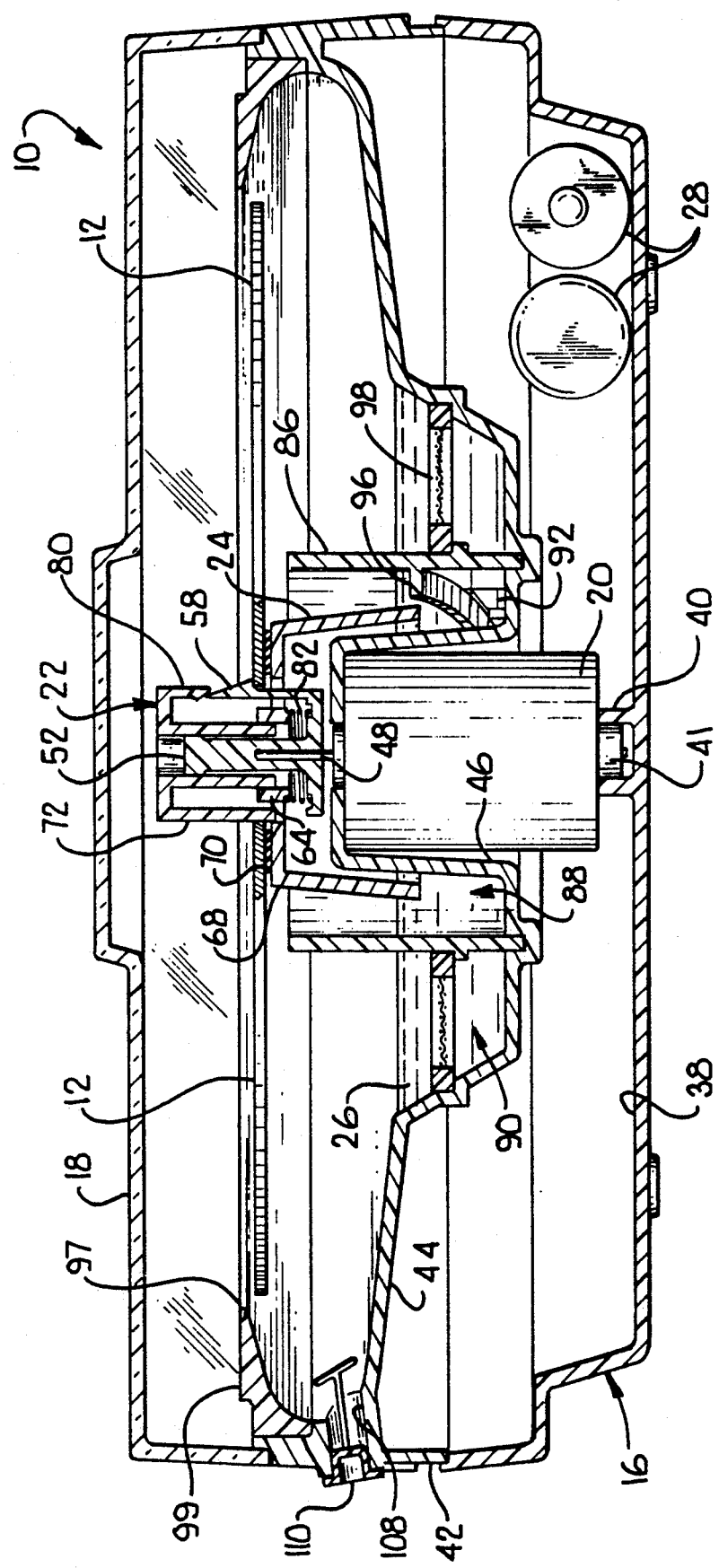
FIG. 3 is a further enlarged vertical sectional view of the cleaner unit taken generally on the line 3—3 of FIG. 2, but illustrating the cleaner unit in a closed configuration.
Figure 6:
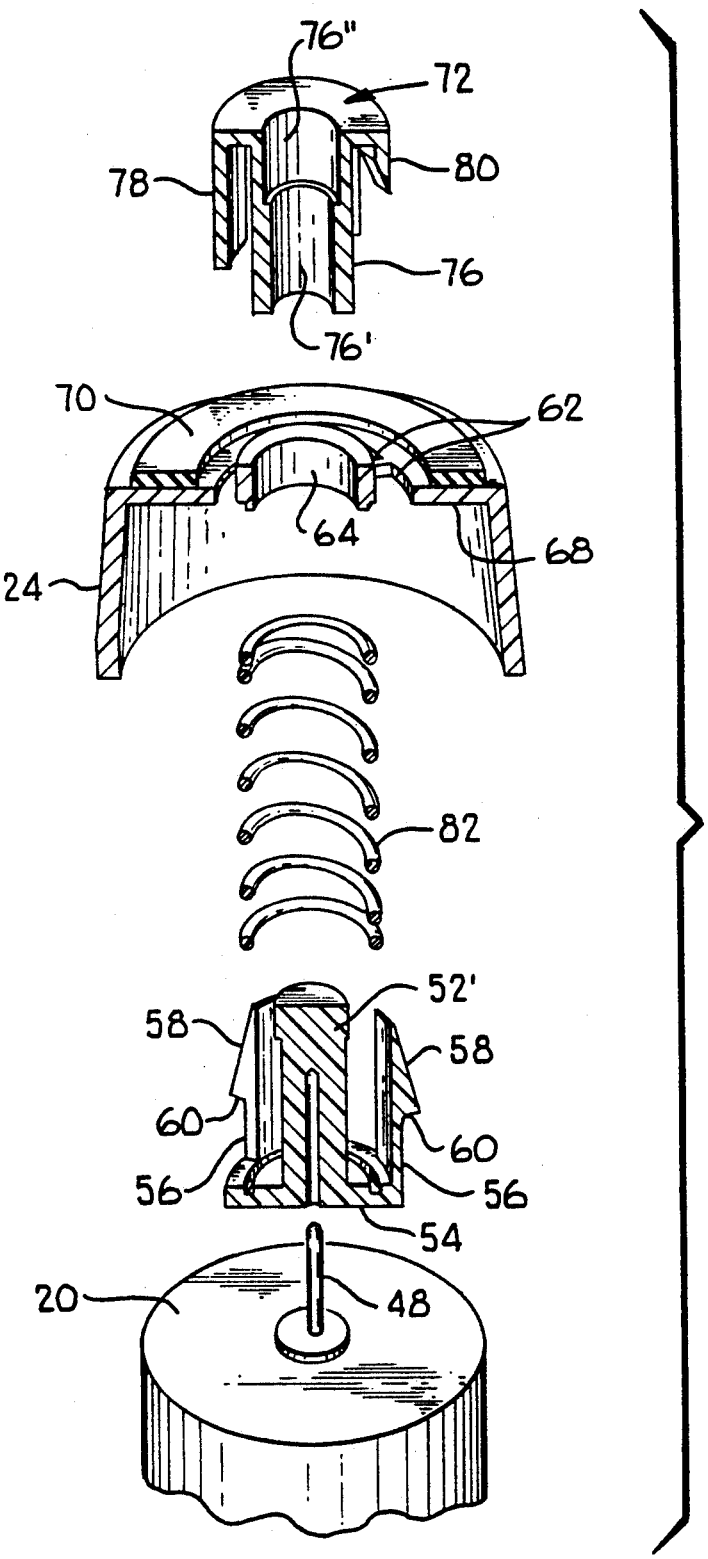
FIG. 6 is an enlarged and exploded perspective view illustrating components of the cleaner unit drive spindle.

As shown in FIGS. 1-3, the cleaner unit 10 comprises a compact housing defined by an upwardly open housing base 16 hingedly connected to an upper lid 18 adapted for movement between an open position (FIG. 1) and a closed position (FIG. 3). In general terms, a drive motor 20 (FIG. 3) mounted within the housing base 16 rotatably drives a spindle 22 adapted for rotatably supporting the information disk 12 to be cleaned. In addition, the drive motor 20 rotatably drives a pump impeller 24 which functions, during rotational movement in one direction, to displace a small jet of the selected cleaning solution 26 against the underside of the spindle-driven disk 12. The drive motor 20 is electrically powered by appropriate connection to batteries 28 mounted within the housing base 16, although it will be understood that alternative power sources such as standard plug-in connection to an ac household power supply could be used, if desired. A control circuit 30 shown generally in FIG. 7 regulates the operation of the drive motor 20 to provide a disk cleaning cycle followed by a short dry cycle, as will be described in more detail. Cleaner unit operation is conveniently initiated by depression of a start button 32 (FIGS. 1 and 7) or the like mounted on the exterior of the housing base 16. Indicator lights may also be provided to visually indicate the state of unit operation, such as a green light 34 and a red light 36 (FIG. 1) for respectively indicating cleaner unit operation in the cleaning cycle and dry cycle.

As shown best in FIG. 3, the cleaner unit housing is conveniently constructed from a relatively small number of housing components which may be economically formed from lightweight molded plastic or the like. In particular, the housing base 16 includes a lower base member 38 having a central cylindrical upstanding boss 40 for seated reception of a lower end 41 of the drive motor 20. An upper base member 42 includes an outer wall securely mounted as by an adhesive or other suitable means onto the lower housing base member 38. Importantly, the outer wall of the upper base member 42 is joined to a contoured reservoir 44 for receiving a selected quantity of the cleaning solution 26. In this regard, as shown in FIG. 3, the reservoir 44 has an upwardly dished geometry which extends from the outer wall in an inward direction with a slight downward taper and then turns downwardly to define a recessed central region. This recessed central region has a generally annular shape surrounding a raised dome 46 shaped to fit over and securely retain the upper end of the drive motor 20.

The drive motor 20 includes a driven output shaft 48 oriented generally on a vertical axis and projecting upwardly through a central opening 50 formed in the dome 46. The output shaft 48 is connected as by press fitting into the lower end of a drive hub 52 forming a portion of the drive spindle 22.

More specifically, with reference to FIGS. 3-6, the drive hub 52 includes a radially outwardly projecting base plate 54 at a lower end thereof. A plurality of upstanding clamp fingers 56 project upwardly from the outer periphery of the base plate 54, with three clamp fingers 56 being shown at equidistant intervals. An upper portion of each clamp finger 56 defines a radially outwardly and downwardly angled cam surface 58, with each cam surface 58 terminating adjacent to a radially inwardly extending and relatively short stop shoulder 60.

The clamp fingers 56 are arranged to project upwardly with clearance through aligned apertures 62 formed in an annular array surrounding a cylindrical support hub 64. More particularly, the support hub 64 is designed for sliding fit reception concentrically within the adjacent group of clamp fingers 56. Outwardly radiating webs are formed integrally with the hub 64 and function to separate the apertures 62 from each other and to connect the support hub 64 to a cylindrical support plate 68. A resilient cushion ring 70 is mounted on the support plate 68 as by means of a suitable adhesive or the like for resiliently supporting an information disk 12, as will be described in more detail.

A cap fitting 72 is also provided as part of the support hub 64. The cap fitting 72 includes an upper annular cap ring 74 having an inner margin joined to a downwardly extending cylindrical sleeve 76. This sleeve 76 is sized and shaped for reception through the support hub 64 associated with the support plate 68, and for close sliding reception over the upstanding drive hub 52. In this regard, the accompanying drawings illustrate a snap-fit connection between the sleeve 76 and a central post portion of the drive hub 52. In particular, the post portion of the drive hub 52 includes a slightly enlarged upper end 52' for snap-fit reception through a lower sleeve bore 76' and into a slightly enlarged upper sleeve bore 76". Importantly, the length of the sleeve 76 is chosen to accommodate vertical sliding displacement of the cap fitting 72 relative to the post portion of the drive hub 52 as by means of fingertip depression of the cap fitting.

The outer periphery of the cap ring 74 is connected to a plurality of downwardly extending alignment fingers 78 disposed in an alternating array with a corresponding plurality of shorter cam fingers 80. The cam fingers 80 have tapered inner ends and are positioned in vertical alignment with the clamp fingers 56 projecting through the aperture 62 in surrounding relation with the support hub 64. A compression spring 82 reacts between the base plate 54 at the bottom of the drive hub 52 and the underside of the support hub 64 for urging the support plate 68 normally toward an elevated position with respect to the cap fitting 72 (FIG. 4).

An information disk 12 normally includes a central aperture 84 to accommodate mounted placement onto appropriate spindle drive means for reading the information stored on the disk. This disk aperture 84 permits disk placement onto the support plate 68 with the cap fitting 72 protruding through the disk aperture 84, as viewed in the left-hand side of FIG. 4. In this configuration, the disk 12 can be pressed downwardly in the direction of arrow 86 in FIG. 4 to displace the support plate 68 in a downward direction relative to the clamp fingers 56. During such displacement, the radially inner margin of the disk aperture engages and then rides over the clamp finger cam surfaces 58, resulting in slight radially inward compression of the fingers sufficient to permit the disk to pass axially beyond the clamp fingers. The clamp fingers 56 then resiliently return to their original nondeflected positions with the disk in engagement with the clamp finger stop shoulders 60 (right-hand side of FIG. 4). In this regard, the drive hub 52 and associated clamp fingers 56 are desirably formed from a molded plastic or the like to accommodate this inward deflection. In this configuration, the compression spring 82 functions to retain the disk 12 tightly against the clamp finger stop shoulders 60, thereby preventing upward disk motion and insuring disk rotational movement with the driven spindle 22. The thus-mounted information disk 12 is positioned generally over and substantially closes the underlying reservoir 44.

Conversely, the disk 12 can be removed quickly and easily from the support hub 52 by pressing downwardly on the cap fitting 72 in the direction of arrow 88, as viewed in FIG. 5. Such downward depression of the cap fitting 72 causes the inboard edges of the cam fingers 80 to ride along the tapered cam surfaces 58 of the clamp fingers 56, and thereby urge the clamp fingers to move in a radially inward direction. Sufficient radial inward movement of the clamp fingers permits the compression spring 82 to return the support plate 68 and the disk 12 thereon toward an upper position (left-hand side of FIG. 4) released from the spindle 22.

The pump impeller 24 is conveniently formed integrally with the spindle 22 for concurrent rotation therewith, such that a single drive motor 20 may be used for rotatably driving all of the moving components of the cleaner unit 10. More particularly, the preferred pump impeller 24 comprises a wall of truncated conical shape which projects downwardly from the outer periphery of the support plate 68. This conical wall is sized for clearance with the dome 46 extending over the drive motor 20. The lower edge of the conical wall extends downwardly into the recessed central region of the reservoir 44 but in spaced relation with the reservoir walls.

An upstanding cylindrical pump wall 86 (FIG. 3) surrounds the pump impeller 24 and subdivides the recessed central region of the reservoir 44 into an inner pump well 88 and an outer return sump 90. A quantity of the selected cleaning solution 26 placed into the reservoir may flow freely between the well 88 and the sump 90 through a lower flow port 92 formed in the wall 86. Importantly, a sufficient quantity of the cleaning solution is placed into the reservoir 44, such that the lower margin of the pump impeller 24 is submerged within the liquid solution when the disk 12 is locked onto the spindle.

When the drive motor 20 rotatably drives the pump impeller 24, the rotating motion of the impeller causes the cleaning solution within the pump well 88 to spin or swirl with a rapid motion. When this driving movement occurs in a first direction, a portion of the cleaning solution 26 is pumped upwardly along an inclined spiral ramp 96 formed on the inboard side of the pump wall 86. This spiral ramp 96 terminates at or near an upper edge of the pump wall 86 and at a radial position closely underlying the information disk 12 near the spindle 22 (FIG. 2). The cleaning solution pumped along the ramp 96 is thus caused to flow as a small jet for contacting the spinning disk 12 at a position substantially conforming with the radially innermost information tracks on the disk.

The disk 12 is rotatably driven by the drive motor 20 when the cleaning solution is applied to the underside of the disk. The rotational action of the spinning disk causes the cleaning solution 26 to shear or spread radially outwardly as a thin film over the entire underside surface of the disk. By appropriate selection of the cleaning solution 26 to include detergents and/or solvents and the like, this spreading film action effectively removes debris, particulate and fingerprint smudges, etc. from the disk without requiring physical contact with cleaning pads or any other nonliquid structures.

The cleaning solution is thrown radially outwardly from the periphery of the spinning disk 12 for collection and recirculation within the housing base 16. More particularly, as shown best in FIG. 3, an annular deflector shroud 99 is seated within the outer wall of the upper base member 42. This deflector shroud 99 defines a ring-shaped and contoured surface extending from an inner margin 97 with a smooth curvature downwardly and radially outwardly with respect to the spinning information disk 12. Importantly, the inner margin 97 of the shroud 99 is disposed in closely spaced relation with and at least slightly above the periphery of the spinning disk 12, such that the cleaning solution 26 thrown from the disk contacts the contoured shroud geometry and is guided downwardly to the tapered outer region of the reservoir 44. The cleaning solution flows further by gravity into the outer sump 90 which may conveniently include an annular particulate filter 98 for recirculation passage through the flow port 92 to the pump well 88.

Figure 7:
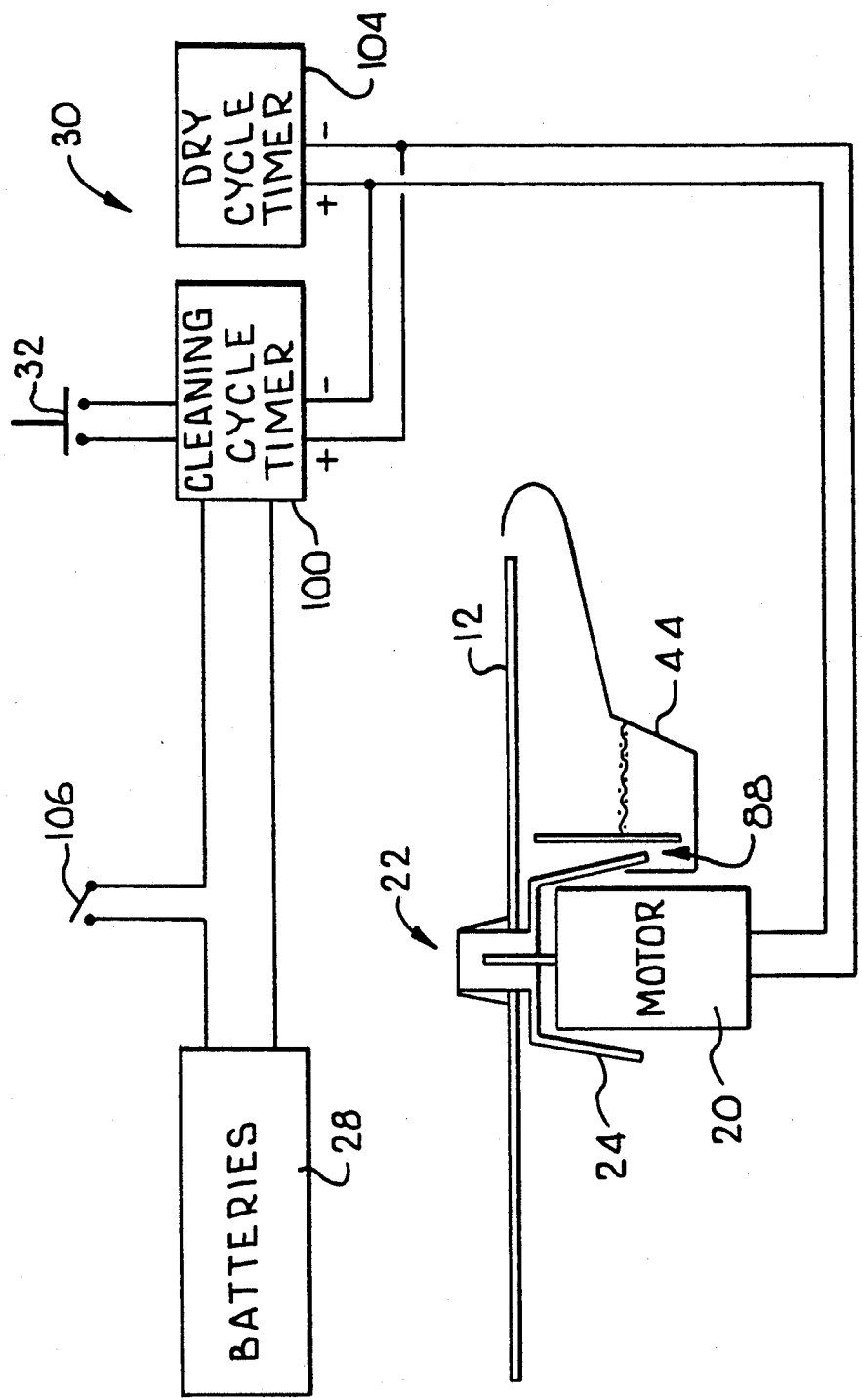
FIG. 7 is a schematic diagram illustrating components of the cleaner unit in association with a control circuit.

FIG. 7 illustrates the preferred control circuit 30 for the cleaner unit 10, in conjunction with a schematic representation of cleaner unit components. More specifically, the cleaner unit 10 is operated by raising the housing lid 18 and installing a selected information disk 12 in a clamped position onto the spindle 22. In this clamped position, the lower margin of the pump impeller 24 is disposed within the cleaning solution 26 within the pump well 88. In this regard, prior to mounting of the disk 12, a selected quantity of the cleaning solution 26 is placed into the reservoir 44. The lid 18 is then closed and the start button 32 depressed to initiate cleaner unit operation.

When the start button 32 is depressed, the control circuit 30 initially energizes the drive motor 20 to rotate the disk 12 and pump impeller 24 in a first direction and at a relatively rapid rotational speed, such as about 2,500 r.p.m. The first direction is specifically selected to ensure solution pumping for upward travel along the spiral ramp 96 to apply a jet of the solution onto the underside surface of the spinning disk 12. This supply of cleaning solution, in combination with the spinning action of the disk 12, causes the underside surface of the disk to be cleaned in a noncontact manner as previously described.

At the conclusion of a short wash or cleaning cycle of perhaps 30 to 45 seconds duration, a cleaning cycle timer 100 forming a portion of the control circuit 30 cycles off and a dry cycle timer 104 reverses the polarity of the electrical connection from the batteries 28 to the drive motor 20. This polarity reversal occurs for the duration of a selected dry cycle time period of perhaps 10 to 20 seconds, and causes the drive motor 20 to spin the disk and impeller in an opposite or second rotational direction, and at a rapid speed such as about 4,000 r.p.m. Importantly, this opposite rotational motion is ineffective to pump cleaning solution along the ramp 96 to the disk surface. Accordingly, during this opposite rotational cycle, residual liquid solution is spun and/or dried from the disk 12, thereby drying the disk in a noncontact manner. At the conclusion of the dry cycle, the dry timer 104 disconnects the drive motor 20 from the power source 28 thereby allowing the disk to spin to a halt, at which time the lid 18 can be opened and the disk 12 removed from the support hub by depression of the cap fitting 72, as previously described. Throughout this cleaning and drying operation, a safety switch 106 mechanically interconnects the lid 18 with the housing base 16 to disable the cleaner unit in the event that the lid 18 is opened prematurely. In addition, a drain port 108 and associated removable drain plug 110 (FIG. 3) may be provided at one side of the reservoir 44 to facilitate draining of the cleaning solution therefrom, when desired.

The improved cleaner unit of the present invention thus provides a compact and easily operated device for cleaning an information disk such as a compact laser disk in a noncontact manner. The disk is cleaned entirely through the action of a liquid jet or spray applied to spinning disk surfaces, without any physical contact with hard and/or potentially abrasive structures. In addition, the cleaned disk is automatically dried in a noncontact manner.

A variety of further modifications and improvements to the cleaner unit 10 of the present invention will be apparent to those skilled in the art. Accordingly, no limitation on the invention is intended by way of the foregoing description and accompanying drawings, except as set forth in the appended claims.

What is claimed is:

1. A method of cleaning an information disk, comprising the steps of:
   rotatably driving an information disk within a housing;
   pumping a jet of a liquid cleaning solution from a reservoir within the housing against one side surface of the rotatably driven information disk such that the jet contacts the disk at a position generally near the disk center;
   said driving step including rotating the disk at a sufficient speed to cause the liquid cleaning solution to spread radially outwardly as a film and substantially without agitation over the one side surface of the disk and to be directed radially outwardly from the periphery of the disk; and
   deflecting the liquid cleaning solution moving radially outwardly from the disk with an annular shroud positioned in relatively closely spaced relation to the disk periphery and having a smoothly contoured shape for redirecting the liquid cleaning solution substantially without agitation to the reservoir for recirculation.

2. The method of claim 1 including the step of substantially enclosing the disk within the housing.

3. The method of claim 1 further including the step of orienting the disk generally horizontally within the housing, and wherein said pumping step comprises pumping the jet of the liquid cleaning solution against the underside of the disk.

4. The method of claim 1 further including the step of filtering the liquid cleaning solution.

* * * * *